United States Patent
Hitzke et al.

(10) Patent No.: US 11,014,038 B2
(45) Date of Patent: May 25, 2021

(54) FILTER MEDIUM

(71) Applicant: MANN+HUMMEL GmbH, Ludwigsburg (DE)

(72) Inventors: Christoph Hitzke, Bamberg (DE); Matthias Heinzmann, Bayreuth (DE); Christoph Krautner, Reisbach (DE); Thomas Pemsel, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 173 days.

(21) Appl. No.: 16/021,497

(22) Filed: Jun. 28, 2018

(65) Prior Publication Data
US 2019/0001253 A1    Jan. 3, 2019

(30) Foreign Application Priority Data
Jun. 30, 2017 (DE) .................... 10 2017 006 179.3

(51) Int. Cl.
*B01D 53/02* (2006.01)
*B01D 53/04* (2006.01)
(Continued)

(52) U.S. Cl.
CPC ..... *B01D 53/0407* (2013.01); *B01D 39/2062* (2013.01); *B01D 53/82* (2013.01);
(Continued)

(58) Field of Classification Search
CPC .......... B01D 2253/102; B01D 2253/25; B01D 2257/302; B01D 2257/304; B01D 2257/40; B01D 2257/406; B01D 2257/7022; B01D 2257/708; B01D 2257/90; B01D 2259/4146; B01D 2259/4148; B01D 2259/4566; B01D 53/0407; B01D 53/82; B01D 53/8612; B01D 53/8634; B01D 53/8681; B01D 53/885; B01J 20/20; B01J 20/28026; B01J 20/28052
See application file for complete search history.

(56) References Cited

U.S. PATENT DOCUMENTS 10,399,027 B2   9/2019   Merz et al.
2006/0243134 A1   11/2006   Bluecher
(Continued)

FOREIGN PATENT DOCUMENTS

DE    102010005114 A1    7/2011

*Primary Examiner* — Christopher P Jones
(74) *Attorney, Agent, or Firm* — James Hasselbeck

(57) ABSTRACT

The invention describes a filter medium (10), in particular for an air filter, in particular an interior air filter or for a fuel cell, including at least three active layers:
a catalytic active layer (12) comprising catalytic activated carbon particles (12*a*),
a second active layer (14) comprising impregnated or catalytic activated carbon particles (14*a*),
a third active layer (16) comprising impregnated or catalytic activated carbon particles (16*a*), wherein at least one active layer comprises impregnated activated carbon particles and the three active layers (12, 14, 16) differ from one another.

The invention further discloses a filter media body including the filter medium; a filter element including the filter media body or the filter medium; an air filter including the filter element or the filter media body or the filter medium, and a production method for producing the filter medium.

6 Claims, 1 Drawing Sheet

(51) Int. Cl.

| | |
|---|---|
| *B01D 53/88* | (2006.01) |
| *B01D 53/82* | (2006.01) |
| *B01D 39/20* | (2006.01) |
| *B01D 53/86* | (2006.01) |
| *B01J 20/20* | (2006.01) |
| *B01J 20/28* | (2006.01) |

(52) U.S. Cl.
CPC ..... *B01D 53/8612* (2013.01); *B01D 53/8634* (2013.01); *B01D 53/8681* (2013.01); *B01D 53/885* (2013.01); *B01J 20/20* (2013.01); *B01J 20/28026* (2013.01); *B01J 20/28052* (2013.01); *B01D 2253/102* (2013.01); *B01D 2253/25* (2013.01); *B01D 2255/702* (2013.01); *B01D 2257/302* (2013.01); *B01D 2257/304* (2013.01); *B01D 2257/40* (2013.01); *B01D 2257/406* (2013.01); *B01D 2257/708* (2013.01); *B01D 2257/7022* (2013.01); *B01D 2257/90* (2013.01); *B01D 2258/06* (2013.01); *B01D 2259/4146* (2013.01); *B01D 2259/4148* (2013.01); *B01D 2259/4566* (2013.01)

(56) References Cited

U.S. PATENT DOCUMENTS

2015/0053080 A1    2/2015   Bluecher
2017/0333870 A1*   11/2017   Wendland .............. B01J 20/261

\* cited by examiner

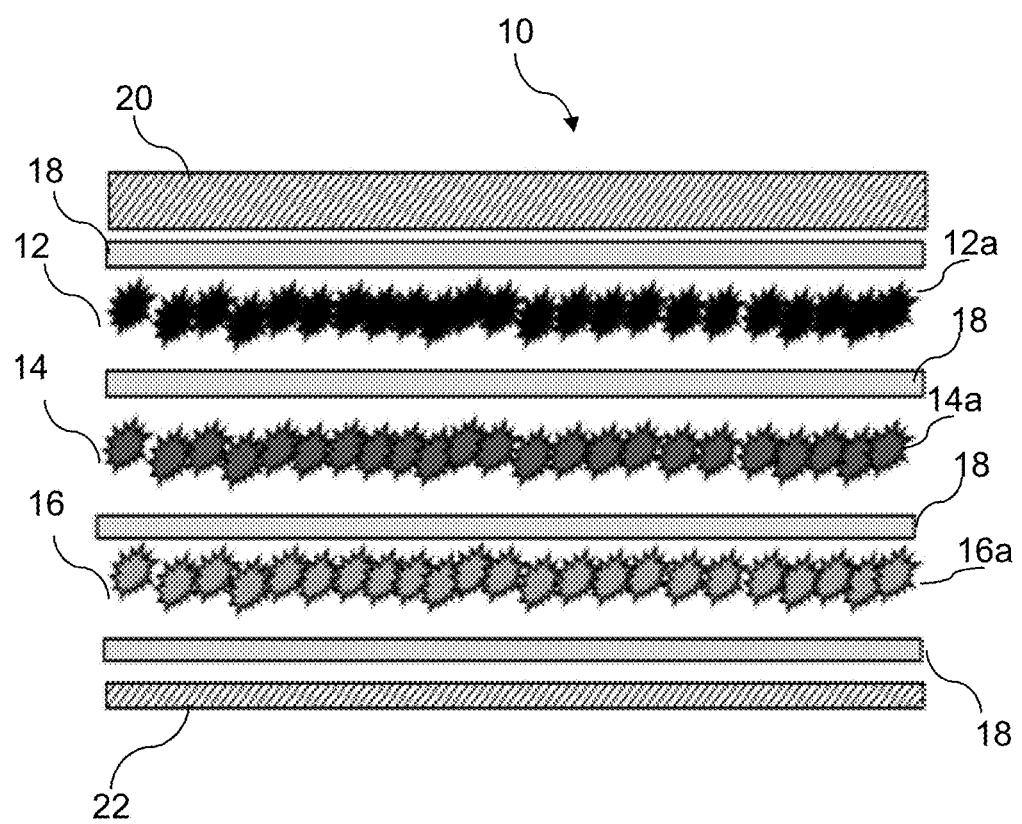

FILTER MEDIUM

TECHNICAL FIELD

The invention relates to a filter medium, to a filter element, to an air filter and to a production method for a filter medium.

BACKGROUND

Filter media, in particular for air filters, in particular for interior air filters, are used to provide a space, for example a passenger compartment of a motor vehicle, but also e.g. fuel cell cathode compartments, with purified air. Filters of this kind are intended to remove not only coarse contaminants resulting from particles, for example pollen or fine dust, but also to remove odors, in particular resulting from gaseous odorants or harmful or reactive gaseous substances. In particular, the challenge in removing gases and odorants is that the different gases and odorants require different adsorption layers on account of their different specific, in particular chemical, properties. However, as the number of adsorption layers increases, the adsorption performance of the filter medium reduces. For example, there is a risk of inhomogeneity of the adsorption layers and, in general, the flow resistance of the filter medium, for example in an air filter, increases such that the energy consumption of an air-conditioning system containing the air filter increases, for example. Usually, filter media having a plurality of adsorption layers are used which are designed such that a compromise is reached between purification and energy consumption. An air filter allowing air to be purged both of particulate contaminants (solid and/or liquid) and of gaseous contaminants may also be referred to as a hybrid filter. Such hybrid filters are commonly specified by specifications that usually refer to the following gases: n-butane, toluene, sulfur dioxide, nitrogen oxides and ozone. Such filters can also be specified according to ISO 11155 Part 2, for example. These standards, on account of their age, are not representative of the gas and odorant profiles which have since come to exist in towns and cities; in particular, odorants and hazardous or reactive gaseous substances, such as formaldehyde for example, are not considered or are considered in a manner that is now insufficient, meaning that the adsorption performance of conventional filters is often unsatisfactory for specific odor profiles.

U.S. Pat. No. 7,758,674 B2 discloses a filter means for filtering the air to be supplied to a fuel cell, wherein the filter means is intended to purify the air from both dirt particles and chemical contaminants. For this purpose, the filter means comprises a non-woven filter fabric by which the dirt particles are removed, as well as a chemical filter region including a layer of activated carbon, including a surface coating having acidic or basic material or activated carbon which is impregnated with said material, and which is used as an adsorption means for adsorbing gaseous components in the air.

DE 10 2013 011 511 A1 discloses a filter means, in particular for the air to be supplied to a fuel cell, comprising a support medium and activated carbon as an adsorption means, wherein the activated carbon is immobilized by adding adhesive.

EP 1 468 718 A1 and DE 203 06 250 U1 disclose an air filter unit comprising a plurality of filter elements containing activated-carbon-based adsorbents as adsorption material, wherein the filter unit contains at least a first filter element that includes granular, in particular spherical, activated carbon as adsorption material, and at least a second filter element that includes a combination of granular, in particular spherical, activated carbon and activated carbon fibers as adsorption material. The filter unit is suitable in particular for use in air supply systems, ventilation systems and air-conditioning systems.

WO 2004/033069 A2 discloses filter media, in particular for water filtration in activated-carbon-based settling tanks, including three superimposed layers comprising a top layer, a middle layer and a bottom layer, wherein the dry weight of the middle layer consists of 80 to 95% activated carbon, wherein 100% of the difference consists of organic and/or inorganic chemical fibers, the dry weight of the bottom layer includes 45 to 100% organic-chemical fibers having OH groups, optionally activated carbon and/or material having a density of less than 0.9, wherein all or some of the OH groups have reacted with a grafting agent RX, where R is a hydrophobic group that is liquid at at least 200° C. and atmospheric pressure, and wherein RX is suitable for forming a volatile leaving group HX during the reaction, and the dry weight of the top layer includes 5 to 25% activated carbon, and 100% of the difference consists of organic and/or inorganic chemical fibers.

DE10 2012 005 380 A1 discloses a filter medium having a biocidal effect for filtering air for an interior of a vehicle, consisting of at least one filter layer and at least one biocidal layer, wherein the biocidal layer includes microcapsules formed from at least one polymer, wherein at least one biocide is stored on and/or in the microcapsules and wherein the filter medium includes a first filter layer formed as a support layer, a second filter layer formed as an activated-carbon layer, a third filter layer formed as a fine dust filter, the biocidal layer, a fourth filter layer formed as an activated-carbon layer and a fifth filter layer formed as a non-woven support fabric.

WO 2012/100113 A1 discloses a filter medium having a first plurality of filter medium particles having a large substrate surface area and including at least one acidic impregnation agent, a second plurality of filter medium particles having a large substrate surface area and including at least one metal oxide, and a third plurality of filter medium particles having a large substrate surface area and including an amine-impregnation agent, and wherein activated carbon is disclosed for the adsorption bed of filter and, as the second plurality of filter medium particles, including a phosphoric-acid-impregnated activated carbon and MgO/CaO-based nanocrystalline material. Disclosed is a plurality of layers of impregnated activated carbon and nanocrystalline material embedded in an adsorption means bed. For optimum performance, a two-layer filter medium is disclosed which comprises a top layer including a homogenous mixture of an MgO/CaO-based nanocrystalline and phosphoric-acid-impregnated Kureha activated carbon, and a second, bottom layer consisting of a single layer of Calgon URC.

DE 44 13 606 A1 discloses a combination filter consisting of a particle filter and an adsorption filter, in particular based on activated carbon, which is produced and impregnated in an operation following a wet-laid non-woven process, wherein, successively, first the particle filter layer and then the adsorption filter layer are produced from a mixture of adsorbent particles and (melt) fibers by suction into a sieve mold having the dimensions corresponding to the final product, and wherein the aqueous dispersion of fibers and adsorbent particles also contains inorganic or organic substances for impregnating the adsorbers, in particular $H_3PO_4$.

WO 02/085426 A2 discloses a respiratory air filter comprising an air-permeable casing and at least one filter layer which is arranged in the casing and contains activated carbon.

US2002/0088346 A1 discloses a filter mass in sheet form for an air filter for an enclosed space, in particular a motor vehicle interior, including standard materials for producing filter masses and carbon elements that are activated for the adsorption of gaseous substances.

GB 2 296 666 A discloses a life-saving apparatus including a motor for driving a disc and a connecting rod of which the upper end is connected to the disc and the lower end is connected to the upper end of compressible bellows, wherein the compressible bellows are inflated by the connecting rod and compressed in order to suck outside air into a filter flask, wherein the filter flask comprises mesh filter layers and wherein a plurality of activated carbon layers are superimposed in the filter flask.

DE 7 110 985 U discloses a filter for gas streams, in particular for gas streams containing radioactive or chemical particles, e.g. air, comprising two or more layers of honeycombed material that are slightly offset with respect to one another in such a way that the cells in one layer are not flush with the cells of another, adjacent layer, that the cells contain activated-carbon granulate and that the edges of the layers are covered with layers of foamed plastics material that are sealingly connected to a surrounding frame.

DE 10 2012 007 503 A1 discloses an adsorptive filter medium, in particular for purifying gases and/or gas mixtures, preferably air, and/or in particular for removing chemical and/or biological toxins and/or noxious substances from gases and/or gas mixtures, preferably air, wherein the filter medium comprises a plurality of a first filter element having a first adsorption material, in particular in the form of adsorbent particles, and a plurality of a second filter element that is different from the first filter element and has a second adsorption material, in particular in the form of adsorbent particles, wherein the first filter element and the second filter element exhibit pressure losses that are different from one another and/or (through-)flow resistances that are different from one another, and wherein the first adsorption material and/or the second adsorption material can be selected, independently of one another, from the group of activated carbon, in particular granular activated carbon, preferably spherical activated carbon, and/or in particular shaped and/or extruded activated carbon and/or powdered activated carbon, and wherein the first adsorption material and/or the second adsorption material can be formed, independently of one another, in particular from particulate activated carbon, in particular from granular, preferably spherical, activated carbon.

WO 2010/127634 A1 discloses a multilayered filter, with a top layer and a bottom layer, including a plurality of layers of a substrate medium and a plurality of layers of nanofibers, wherein the top layer and the bottom layer each comprise a layer of the nanofibers, and at least one unit including two layers of nanofibers between two substrate medium layers is provided between the top and the bottom layer, and wherein a substrate medium layer can include activated carbon fibers.

DE 10 2015 205 551 A1 discloses a multilayered filter material for an interior space filter element of an air-conditioning system of a vehicle, for adsorbing in particular odorants, wherein the multilayered filter material includes an active layer comprising non-impregnated activated carbon particles, an impregnation layer comprising impregnated activated carbon particles and an ion exchange layer comprising ion exchange particles.

DE 10 2005 016 677 A1 discloses a filter element comprising a multilayered filter material, in which an active layer arranged on the inflow side is provided with activated carbon fibers which abut, on the outflow side, an adsorber layer comprising granular adsorbents. A further active layer comprising activated carbon fibers can abut said adsorber layer on the outflow side. The adsorbents used in this case can include activated carbon, zeolites, cyclodextrins, silicates, ion exchangers and aluminosilicates.

DE 10 2012 007 503 A1 discloses a further adsorptive filter medium in which a plurality of first filter layers having a first adsorption substance and a plurality of second filter layers that are different from the first layers and have a second adsorption substance are provided, which layers alternate and exhibit varying through-flow resistances or pressure losses.

DE 10 2009 021 020 A1 discloses a further adsorptive filter material containing an exchange resin loaded with metal cations.

SUMMARY OF THE INVENTION

The object of the invention is to provide a filter medium having effective and balanced adsorption performance for a wide range of gases, and thus for gas and odorant profiles having different properties, in particular for gas and odorant profiles including n-butane, VOCs, NOx, $SO_2$, $H_2S$, $NH_3$ and $CH_2O$.

The filter medium according to the invention, in particular for an air filter, in particular an interior air filter or for a fuel cell, includes a catalytic active layer comprising catalytic activated carbon particles, in particular consisting thereof, a second layer comprising impregnated or catalytic activated carbon particles, in particular consisting thereof, a third active layer comprising impregnated or catalytic activated carbon particles, in particular consisting thereof, wherein at least one active layer comprises impregnated activated carbon particles, wherein the three active layers differ from one another.

Activated carbon in which the electron structure of the carbon is altered on the surface by an activation process is suitable as catalytic activated carbon. In one embodiment, 1 g of catalytic activated carbon is provided at a temperature of 23° C. and at standard pressure in a mixture of 80 ml water and 30 ml 30 wt. % $H_2O_2$ solution, whereupon a temperature increase of >23° C. occurs after 5 min, and >33° C. occurs after 10 min. Evidence of the catalytic nature of the activated carbon can thus be deduced in this manner.

Activated carbon comprising an impregnation deposited on the carbon is suitable as impregnated activated carbon. The gases and odorants to be removed are chemically bonded by the impregnation deposited on the carbon or are converted thereby into a form that can be adsorbed by the closest active layer. In other words, the impregnations deposited on the activated carbon interact in a chemisorptive manner with the relevant gas or odorant. The impregnated active layer thus has additional chemisorption properties which enhance the adsorption or adapt it to a predefined compound profile. The impregnation can be deposited on activated carbon or on catalytic activated carbon in the context of the invention. Suitable impregnations are, for example, potassium carbonate for targeted removal of acidic gases (pH<7 when measured under standard conditions and in aqueous solution), hydrogen sulfide, sulfur dioxide or nitrogen dioxides, phosphoric acids ($H_3PO_4$) and/or sulfuric acid ($H_2SO_4$) for targeted removal of alkaline gases (pH>7 when measured under standard conditions and in aqueous solution), ammonia and amines, and/or potassium iodide for targeted removal of hydrogen sulfide, and/or caustic soda (NaOH) for targeted removal of acidic gases and hydrogen sulfide, and/or sulfur and/or silver.

In particular, the impregnated active layer can comprise activated carbon that has been impregnated multiple times and has been treated with at least two of the above-mentioned substances. Impregnated activated carbon that has been impregnated with phosphoric acid and ethylene urea is preferred. It is also possible for the impregnated active layer to comprise a mixture of at least two activated carbon particles that are impregnated with different substances.

In a preferred embodiment, the filter medium includes an active layer comprising catalytic activated carbon particles, a second active layer comprising impregnated activated carbon particles and a third active layer comprising impregnated or catalytic activated carbon particles.

In a particularly preferred embodiment, the filter medium includes an active layer comprising catalytic activated carbon particles, a second active layer comprising impregnated activated carbon particles and a third active layer comprising impregnated activated carbon particles.

The sequence of the active layers can be freely selected according to the invention, and can be selected so as to be adapted to a specific gas or odorant profile. For example, the sequence of the active layers can have the second layer comprising impregnated activated carbon particles as the outer active layer, a catalytic layer comprising catalytic activated carbon particles as the middle layer in between, and finally the third, outer active layer comprising impregnated activated carbon particles. The first, outer active layer in the sequence is preferably a catalytic active order. This is advantageous in that the second active layer can be easily adapted to the moisture content and the still-acidic environment (pH<7) of the gas stream.

It is also conceivable for the filter medium to have a sequence having a first, outer active layer comprising catalytic activated carbon particles, a second, middle active layer comprising catalytic activated carbon particles and the third, outer active layer comprising impregnated activated carbon particles.

The filter medium according to the invention can thus advantageously be adapted to the specific requirements of a specific gas and odorant profile; in particular, a gas and odorant profile composed, for example, of acidic (pH<7) and/or hydrophilic gases and odorants and basic (pH>7) and/or organic, in particular hydrophobic gases and odorants, in particular including n-butane, VOCs, NOx, $SO_2$, $H_2S$, $NH_3$ and $CH_2O$, can be filtered with effective adsorption performance.

In one embodiment of the filter medium, the catalytic active layer comprises catalytic activated carbon particles for removing acidic (pH<7 when measured under standard conditions and in aqueous solution) and/or hydrophilic gases. This is advantageous in that both hydrophilic and acidic (pH<7) gases and also water, found in the gas stream, from basic and/or organic, in particular hydrophobic gases and odorants, in particular hazardous or reactive gaseous substances, can easily be separated.

In one embodiment of the filter medium, the catalytic active layer comprises catalytic activated carbon particles having an area density of from 50 to 300 g/m², in particular 150 to 300 g/m².

In one embodiment of the filter medium, the catalytic activated carbon particles are bonded, in particular cross-linked, by the addition of adhesive. This bond, in particular cross-linking, is advantageously achieved by the addition of adhesive, the adhesive threads of which adhere to the surface of the activated carbon particles and interconnect different activated carbon particles without, however, impairing the adsorption performance of the activated carbon. Suitable adhesives include, for example, reactive hot-melt adhesives, e.g. based on polyurethane or silane. A thermoplastic adhesive produced e.g. based on polyolefins is also possible.

In one embodiment of the filter medium, the second active layer comprises impregnated activated carbon particles for removing ammonia.

In a further embodiment, the second active layer comprises phosphoric-acid-impregnated activated carbon particles. The impregnation with phosphoric acid ($H_3PO_4$) is advantageous in that ammonia ($NH_3$) is bonded by chemisorption and thus, in contrast with physisorption, is more tightly bonded to the adsorbent (substrate) by chemical bonds, and is therefore particularly safely adsorbed. In further embodiments, the impregnation consists of 2 to 15 wt. %, in particular 3.5 to 15 wt. %, in particular 2 to 6 wt. % phosphoric acid.

In a further embodiment, the second active layer comprises activated carbon particles having an area density of from 50 to 300 g/m², in particular 50 to 150 g/m².

In a further embodiment, the first, outer active layer in the sequence is a catalytic active layer comprising catalytic activated carbon particles. The combination of the sequence selection and an additional adaptation of the area density allows an additionally favorable carbon-to-adhesive ratio to be achieved.

The active layers can lie directly one on top of the other in embodiments.

In further embodiments, the impregnated activated carbon particles are bonded, in particular cross-linked, by the addition of adhesive. This bond, in particular cross-linking, is advantageously achieved by the addition of adhesive, the adhesive threads of which adhere to the surface of the activated carbon particles and interconnect different activated carbon particles without, however, impairing the adsorption performance of the activated carbon. Suitable adhesives include, for example, reactive hot-melt adhesives, e.g. based on polyurethane or silane. A thermoplastic adhesive produced e.g. based on polyolefins is also possible.

In a further embodiment, the adhesive is a reactive hot-melt adhesive.

In a further embodiment, the third active layer comprises impregnated activated carbon particles for removing ammonia and formaldehyde. This is advantageous in that in particular ammonia residues can be particularly thoroughly removed. In addition, a layer of this kind can also be designed simply to reliably adsorb formaldehyde.

In a further embodiment, the third active layer comprises activated carbon particles impregnated with ethylene urea and phosphoric acid. This is advantageous in that both the ammonia and formaldehyde, for example, are chemically bonded to the adsorption substrate by chemisorption. In further embodiments, the impregnation consists of 2 to 15 wt. %, in particular 3.5 to 15 wt. %, in particular 2 to 6 wt. % phosphoric acid and 10 to 20 wt. % ethylene urea.

In a further embodiment, the third active layer comprises activated carbon particles having an area density of from 50 to 300 g/m², in particular 50 to 150 g/m². This is additionally advantageous in that the formaldehyde, having a low molecular weight, and the ammonia are particularly advantageously adsorbed.

In a further embodiment, the impregnated activated carbon particles are bonded, in particular cross-linked, by the addition of adhesive. This bond, in particular cross-linking, is advantageously achieved by the addition of adhesive, the adhesive threads of which adhere to the surface of the activated carbon particles and interconnect different activated carbon particles without, however, impairing the adsorption performance of the activated carbon. Suitable adhesives include, for example, reactive hot-melt adhesives, e.g. based on polyurethane or silane. A thermoplastic adhesive produced e.g. based on polyolefins is also possible.

In a further embodiment, the adhesive is a reactive hot-melt adhesive.

In a further embodiment, the filter medium comprises at least one support layer. The support layer may be a textile support layer, in particular a non-woven fabric. The support layer can in this case support the activated carbon particles or adjoins at least the active layer. The support layer is designed for example as a support layer which optionally implements mechanical filtration of particulate contaminants of the gas stream to be purified. In this case, the support layer forms a non-woven support or filter fabric by which dirt particles can be removed. The non-woven fabric is made e.g. from polyester, polypropylene, polyamide, polyacrylonitrile or polycarbonate.

In one embodiment, the activated carbon forms an active layer that directly adjoins the support layer and is preferably connected to the support layer by the adhesive. This involves both gluing the active layer to the support layer and bonding by means of adhesive threads that have not yet set and are applied to the activated carbon particles. The support layer therefore borders the active layer at least on one side and is simultaneously connected to the active layer. This embodiment allows open support-activated-carbon layers having fixed activated carbon particles to be formed. Such support-activated-carbon layers include at least one support layer and an activated carbon layer, and can easily be stacked one on top of the other, the through-flow direction preferably being in the stacking direction, thus orthogonal to the plane of the layers.

At least two support layers are provided in a further embodiment, the filter medium preferably being formed without an additional filtration layer. In this embodiment, the at least three active layers directly abut one another in a top and a bottom support layer.

According to an alternative embodiment, at least one active layer can be bordered by a support layer on both its lateral surfaces. The active layer is expediently also bonded to both support layers.

In a further embodiment, the filter medium comprises at least one filtration layer, in particular a particle filter layer. The filtration layer is in particular formed as a textile particle filter layer, in particular as a non-woven fabric.

According to a further expedient embodiment, at least one active layer can be sealed along the longitudinal sides and/or broadsides thereof, such that, optionally together with the support layers abutting the lateral surfaces, the activated carbon layer can be bordered on all sides. The sealing along the longitudinal sides and/or broadsides increases stability and improves the security against delamination and displacements in the particular active layer.

According to a further expedient embodiment, at least one active layer can be provided with a seal on its end faces, i.e. the broadsides and the longitudinal sides. Active layers that lie directly one on top of the other are advantageously not bonded together; rather, the bonding takes place only by means of the relevant directly adjoining support layer.

Suitable types of activated carbon are, for example, types of activated carbon based on various raw materials, such as coconut, hard coal, charcoal or synthetic starting materials, comprising different levels of activation, different catalytic properties and varying impregnations. This allows an additional, advantageous adaptation to the target gas spectrum. Preferred raw materials are coconut, hard coal and charcoal, with coconut activated carbon being particularly preferred.

The object is additionally achieved by a filter media body including a filter medium according to the invention and at least one lateral band.

In one embodiment, the filter media body is formed as a wound body, is layered as a flat filter or is folded as filter bellows.

The object is additionally achieved by a filter element including a filter media body according to the invention or a filter medium according to the invention, a frame, retaining elements and at least one seal. In one embodiment, the filter element is an air filter element. In a further embodiment, the filter element is an interior air filter element.

The object is additionally achieved by an air filter including a filter element according to the invention or a filter media body according to the invention or a filter medium according to the invention. In one embodiment, the air filter is an interior air filter.

The object is also achieved by a fuel cell including an air filter according to the invention or a filter element according to the invention or a filter media body according to the invention or a filter medium according to the invention.

The object is also achieved by an air-conditioning system including an air filter according to the invention or a filter element according to the invention or a filter media body according to the invention or a filter medium according to the invention.

The object is also achieved by using the filter medium according to the invention in air-conditioning systems, interior filters, filter elements, air filters, in particular ambient air filters, air-supply systems, ventilation systems, fuel cells, in particular fuel cell air filters, in particular fuel cell cathode air filters.

Method for producing a filter medium according to the invention, including the steps of applying a first catalytic active layer comprising catalytic activated carbon particles, in particular consisting thereof, to a support layer, applying a second active layer comprising impregnated or catalytic activated carbon particles, in particular consisting thereof, to the first active layer, and applying a third active layer comprising impregnated or catalytic activated carbon particles, in particular consisting thereof, to the second active layer, wherein the sequence of the first, second and third active layer is selected so as to be interchangeable, and wherein, additionally, a filtration layer or a further support layer is applied to the last-applied activated carbon layer.

In a preferred embodiment, the at least one active layer comprises impregnated activated carbon particles.

In a preferred embodiment of the method according to the invention, a catalytic active layer comprising catalytic activated carbon particles is applied to a support layer, then an active layer comprising impregnated activated carbon particles is applied, and finally an active layer comprising impregnated or catalytic activated carbon particles is applied.

In a further embodiment of the method, an adhesive is applied before each active layer is applied.

In further embodiments of the method, at least one further support layer is applied, in particular a further support layer is applied to the third active layer, for example.

In further embodiments of the method, a filtration layer is additionally applied.

The invention also includes a filter medium produced in accordance with the method according to the invention.

BRIEF DESCRIPTION OF THE DRAWINGS

In the drawings:

FIG. 1 is a highly simplified sectional view of a filter medium according to one embodiment.

DETAILED DESCRIPTION

Referring now to FIG. 1, as an exemplary embodiment having specific limitation of the present inventive disclosure is discussed below. The filter medium (10) includes a particle filtration layer (20) of a non-woven or woven fabric. The filter medium (10) further includes at least three active layers (12, 14 and 16) as discussed further below (see FIG. 1.).

The first active layer is a first catalytic active layer (12) having catalytic activated carbon particles (12a) impregnated with first impregnation material of potassium carbonate for targeted removal of acidic gases (pH<7). As shown in FIG. 1, the first catalytic active layer (12) is arranged at a flow face of the particle filtration layer (20). The first active layer (12) includes a first adhesive (18) bonding and cross-linking the catalytic activated carbon particles (12a) together such that the adhesive bonds the first catalytic active layer (12) to the particle filtration layer (20).

The second active layer (14) is arranged on an opposite side of the first catalytic active layer (12) relative to the particle filtration layer (20), see FIG. 1. The second active layer (14) has catalytic activated carbon particles (14a) impregnated with a second impregnation material, the second impregnation material selected from the set consisting of: hydrogen sulfide, sulfur dioxide, nitrogen dioxides, phosphoric acids, sulfuric acid, or combinations of these, for targeted removal of alkaline gases (pH>7). The second active layer (14) includes a second adhesive (18) bonding and cross-linking the activated carbon particles (14a) of the second active layer together.

The third active layer (16), see FIG. 1, is arranged on an opposite side of the second active layer (14) relative to the first catalytic active layer (12). The third active layer (16) having catalytic activated carbon particles (16a) impregnated with a third impregnation material comprising ethylene urea and phosphoric acid for removing ammonia and formaldehyde. The third active layer (16) includes a third adhesive (18) bonding and cross-linking the activated carbon particles of the third active layer (16) together.

FIG. 1 shows a filter medium 10, in particular for an air filter, in particular an interior air filter or for a fuel cell, the filter medium comprising a catalytic outer active layer 12 comprising catalytic activated carbon particles 12a, a second, middle active layer 14 comprising impregnated activated carbon particles 14a and a third, outer active layer 16 comprising impregnated or catalytic activated carbon particles 16a, wherein at least one active layer, for example the third active layer 16, comprises impregnated activated carbon particles 16a. The catalytic activated carbon particles 12a of the catalytic active layer 12, which is an outer layer in FIG. 1, of the filter medium 10 can, as shown schematically in FIG. 1, also be bonded, in particular cross-linked, by the addition of adhesive 18. The adhesive 18 can advantageously be a reactive hot-melt adhesive, for example based on polyurethane. The adhesive 18 can also advantageously connect a filtration layer 20, in particular a particle filtration layer 20, to the catalytic active layer 12. The catalytic activated carbon particles 12a of the catalytic active layer 12 can have an area density of from 50 to 300 g/m², in particular 150 to 300 g/m². The catalytic active layer 12 advantageously comprises catalytic activated carbon particles 12a for removing acidic (pH<7) and/or hydrophilic gases, and thus removes hydrophilic gases and additionally adsorbs some of the water found in the gas stream. This allows the gas stream to be easily dried before passing through an active layer, for example the second active layer 14, designed for basic and/or organic, in particular hydrophobic gases and odorants, in particular hazardous or reactive gaseous substances, as a result of which the adsorption power is additionally optimized for basic and/or organic, in particular hydrophobic gases and odorants hazardous or reactive gaseous substances.

The impregnated activated carbon particles 14a of the second active layer 14 of the filter medium 10 can, as shown schematically in FIG. 1, also be bonded, in particular cross-linked, by the addition of adhesive 18. The adhesive 18 can advantageously be a reactive hot-melt adhesive, for example based on polyurethane. Advantageously, the second active layer 14 comprises impregnated activated carbon particles 14a for removing ammonia, in particular phosphoric-acid-containing particles 14a. The phosphoric acid impregnation induces chemisorption of ammonia from the gas stream to be purified. For example, the impregnation can consist of 2 to 15 wt. %, in particular 3.5 to 15 wt. %, in particular 2 to 6 wt. % phosphoric acid.

The chemisorption allows for more tightly bonded chemical bonds to the adsorbent compared with physisorption, as a result of which the ammonia is particularly advantageously bonded. Particularly advantageously, the impregnated activated carbon particles 14a of the second active layer 14 have an area density of from 50 to 300 g/m², in particular 50 to 150 g/m². The area density can easily be adapted to the moisture content of the active layer and the environment of the gas stream, which means a smaller amount of adhesive is required in order to bond, in particular to cross-link, the impregnated activated carbon particles 14a. By adapting the area density, a favorable carbon-to-adhesive ratio is thus additionally achieved. The second active layer 14 is particularly advantageously arranged as the middle layer between the catalytic outer active layer 12 and the third, outer active layer 16.

The impregnated activated carbon particles 16a of the second active layer 16 of the filter medium 10 can, as shown schematically in FIG. 1, also be bonded, in particular cross-linked, by the addition of adhesive 18. The adhesive 18 can advantageously be a reactive hot-melt adhesive, for example based on polyurethane. The adhesive 18 can also advantageously connect a particle filtration layer 20 to the first active layer 12. The third active layer 16 can in particular comprise impregnated activated carbon particles 16a for removing ammonia and formaldehyde. The third active layer 16 can comprise activated carbon particles 16a impregnated with ethylene urea and phosphoric acid, for example. The impregnated activated carbon particles 16a of the third active layer 16 can have an area density of from 50 to 300 g/m², in particular 50 to 150 g/m². The impregnation can consist of 2 to 15 wt. %, in particular 3.5 to 15 wt. %, in particular 2 to 6 wt. % phosphoric acid and 10 to 20 wt. % ethylene urea, for example.

The filter medium 10 can additionally comprise a support layer 22, in particular a textile support layer 22, in particular a support layer 22 formed as a non-woven fabric.

The filter medium 10 can additionally comprise a filtration layer 20, in particular formed as a textile particle filter layer 20, in particular formed as a non-woven fabric.

What is claimed is:

1. A filter medium for an air filter, comprising:
a particle filtration layer of a non-woven or woven fabric;
at least three active layers, comprising:
   a first catalytic active layer comprising:
      catalytic activated carbon particles impregnated with first impregnation material of potassium carbonate for targeted removal of acidic gases (pH<7), the a first catalytic active layer arranged at a flow face of the particle filtration layer; and
      a first adhesive bonding and cross-linking the catalytic activated carbon particles together, the adhesive bonding the first catalytic active layer to the particle filtration layer;
   a second active layer arranged on an opposite side of the first catalytic active layer relative to the particle filtration layer, the second active layer comprising:
      catalytic activated carbon particles impregnated with a second impregnation material, the second impregnation material selected from the set consisting of: hydrogen sulfide, sulfur dioxide, nitrogen dioxides, phosphoric acids, sulfuric acid, or combinations of these, for targeted removal of alkaline gases (pH>7); and
      a second adhesive bonding and cross-linking the activated carbon particles of the second active layer together;
   a third active layer arranged on an opposite side of the second active layer relative to the first catalytic active layer, the third active layer comprising:
      catalytic activated carbon particles impregnated with a third impregnation material comprising ethylene urea and phosphoric acid for removing ammonia and formaldehyde;
      a third adhesive bonding and cross-linking the activated carbon particles of the third active layer together, and
wherein the at least three active layers differ from one another.

2. The filter medium according to claim 1, wherein the second active layer comprises impregnated activated carbon particles for removing ammonia.

3. The filter medium according to claim 1, wherein the second active layer comprises phosphoric-acid-impregnated activated carbon particles.

4. The filter medium according to claim 1, wherein the filter medium comprises a support layer of a non-woven fabric, arranged on an opposite side of the third active layer relative to the second active layer.

5. A filter element comprising:
a filter medium according to claim 1;
a frame surrounding the filter medium, outer edges of the active layers of the filter medium sealingly connected to the frame;
at least one retaining element and/or at least one seal.

6. An air filter comprising:
a filter element according to claim 5; and
a housing.

* * * * *